United States Patent Office 3,299,017
Patented Jan. 17, 1967

3,299,017
COPOLYMERS OF 1,3-BUTADIENE AND A
NORBORNADIENE
Robert P. Zelinski and Floyd E. Naylor, Bartlesville,
Okla., assignors to Phillips Petroleum Company, a corporation of Delaware
No Drawing. Filed Apr. 29, 1963, Ser. No. 276,166
12 Claims. (Cl. 260—82.1)

This invention relates to novel polymers of 1,3-butadiene. In one aspect, it relates to a method for producing a polymer of 1,3-butadiene having a reduced tendency to cold flow. In another aspect, it relates to a method for improving the processability of polymers of 1,3-butadiene.

A great deal of research work has been conducted during the last few years with the object of producing improved rubbery polymers. One of the products that has attracted widespread attention because of its superior properties is a polybutadiene containing a high percentage, e.g., at least 85 percent, of cis 1,4-addition. The physical properties of this polymer are of such a nature that it is particularly suitable for the fabrication of automobile and truck tires and other articles for which conventional synthetic polymers have heretofore been comparatively unsatisfactory. However, in the processing of the polymer, particularly in packaging, shipping and storage, a certain amount of difficulty has been encountered because of the tendency of the polymer to cold flow when in the unvulcanized state. For example, if cracks or punctures develop in the packages used in storing the polymer, polymer will flow from the packages with a resulting loss or contamination and sticking together of the stacked packages. It has also been found that cis-polybutadiene is often difficult to process. It is essential that a polymer be processable, for otherwise its use is seriously limited.

It is an object of this invention, therefore, to provide a polybutadiene composition containing a high percentage of cis 1,4-addition, which has a reduced tendency to cold flow when in the unvulcanized state and which possesses improved processing characteristics.

Another object of the invention is to provide a method for eliminating or substantially reducing the tendency of cis-polybutadiene to cold flow when in the unvulcanized state.

Still another object of the invention is to provide a process for improving the processability of cis-polybutadiene.

A further object of the invention is to provide a novel copolymer of 1,3-butadiene and a norbornadiene.

Other and further objects and advantages of the invention will be apparent to those skilled in the art upon consideration of the accompanying disclosure.

The present invention is concerned with the production of polymers of 1,3-butadiene having a reduced tendency to cold flow and possessing improved processing characteristics. Thus, the invention relates to an improvement in a process for polymerizing 1,3-butadiene with a catalyst system which forms on mixing components comprising an organometal component and an iodine-containing component. Broadly speaking, the improvement comprises adding to the polymerization mixture a minor amount of a norbornadiene. As determined by infrared analysis, the product obtained from this polymerization reaction is a copolymer of 1,3-butadiene and a norbornadiene in which at least 85 percent, e.g., from 85 to 98 percent and higher, of the butadiene units have a cis 1,4-configuration. This novel copolymer has a greatly reduced tendency to cold flow while still retaining the desirable physical properties of conventional cis-polybutadiene. Furthermore, the copolymer of this invention possesses improved processing characteristics. For example, in the compounding of the copolymers, shorter mixing times are required. This results from the fact that there is a more rapid heat buildup during mixing as compared to conventional cis-polybutadiene, which facilitates the incorporation of compounding ingredients. Furthermore, the novel copolymers have better extrusion and milling characteristics and exhibit a considerably longer scorch time than cis-polybutadienes prepared according to previous methods. When copolymers prepared in accordance with the process of this invention are blended with other rubbers, e.g., a copolymer of butadiene and styrene, the resulting compositions have better processing characteristics than those prepared with conventional cis-polybutadiene. Other unsaturated cyclic compounds, such as 1,5-cyclooctadiene, cyclododecatriene, dicyclopentadiene, norbornylene (bicycloheptene), and cyclooctatetraene, have been added to polymerization systems employed in producing cis-polybutadiene, but these materials were found to have little, if any, effect on the properties of the polymer products. It was completely unexpected, therefore, when it was found that the addition of a norbornadiene to the polymerization systems resulted in the formation of a copolymer having such outstanding properties.

The norbornadienes, often referred to as bicyclo(2,2,1)-hepta-2,5-dienes, employed in the practice of the present process can be represented by the formula

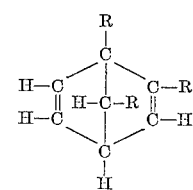

wherein R is hydrogen or an alkyl group containing from 1 to 4, inclusive, carbon atoms and wherein at least two of the R groups are hydrogen. It is often preferred to use norbornadiene itself, i.e., the compound according to the foregoing formula in which each R is hydrogen. Of the alkyl derivatives, it is generally preferred to use those that are substituted in the 7-position. Examples of these latter compounds include 7-methylnorbornadiene, 7-ethylnorbornadiene, 7-n-propylnorbornadiene, 7-isopropylnorbornadiene, 7-n-butylnorbornadiene and 7-tert-butylnorbornadiene. Other examples of norbornadienes that can be employed are 1-methylnorbornadiene, 2-methylnorbornadiene, 2-ethylnorbornadiene, 1-isopropylnorbornadiene, 2-n-butylnorbornadiene, and the like.

As mentioned above, only a minor amount of the norbornadiene is added to the polymerization system. The actual amount used will depend, at least to some degree, upon the particular type of product desired. The amount is usually in the range of 0.01 to 10 parts by weight, preferably in the range of 0.05 to 2 parts by weight, per 100 parts by weight of monomer. The norbornadiene can be added to the polymerization zone by itself or it can be charged as a solution in a hydrocarbon, preferably similar to the hydrocarbon used as the polymerization diluent.

The novel copolymer of this invention can be prepared by polymerizing 1,3-butadiene and a norbornadiene with any one of a large number of stereo-specific catalyst systems. It is usually preferred to employ a catalyst which is selected from the group consisting of (1) a catalyst which forms on mixing components comprising an organometal compound having the formula $R_mM$, wherein R is an alkyl, cycloalkyl, aryl, alkaryl, aralkyl, alkylcycloalkyl, cycloalkylalkyl, arylcycloalkyl or cycloalkylaryl radical, M is aluminum, mercury, zinc, beryllium, cadmium, magnesium, sodium or potassium, and $m$ is equal to the valence of the metal M, and titanium tetraiodide, (2) a catalyst which forms on mixing components comprising an organometal compound having the formula $R_nM'$, wherein R is an organo radical as defined above, M' is aluminum, magnesium, lead, sodium or potassium, and $n$ is equal to the valence of the metal M', titanium tetrachloride and titanium tetraiodide, (3) a catalyst which forms on mixing components comprising an organometal compound having the formula $R_aM''$ or $R_2AlH$, wherein R is an organo radical as defined above, M'' is aluminum or magnesium and $a$ is equal to the valence of the metal M'', a compound having the formula $TiX_b$, wherein X is chlorine or bromine and $b$ is an integer from 2 to 4, inclusive, and elemental iodine, hydrogen iodide, lithium iodide, an iodine halide, or an iodohydrocarbon, (4) a catalyst which forms on mixing components comprising an organometal compound having the formula $R_xM'''$, wherein R is an organo radical as defined above, M''' is aluminum, gallium, indium or thallium, and $x$ is equal to the valence of the metal M''', a titanium halide having the formula $TiX_4$, wherein X is chlorine or bromine, and an inorganic halide having the formula $M^{iv}I_c$, wherein $M^{iv}$ is beryllium, zinc, cadmium, aluminum, gallium, indium, thallium, silicon, germanium, tin, lead, phosphorus, antimony, arsenic, and bismuth, and $c$ is an integer from 2 to 5, inclusive, and (5) a catalyst which forms on mixing components comprising an organo compound having the formula $R_xM'''$, wherein R, M''' and $x$ are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth, X is chlorine or bromine, and $d$ is an integer from 2 to 5, inclusive. The R radicals of the aforementioned formulas preferably contain up to and including 20 carbon atoms.

The following are examples of preferred catalyst systems which can be used to polymerize 1,3-butadiene to a cis 1,4-polybutadiene; triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri - alpha - naphthylaluminum, titanium tetrachloride and iodine; tribenzylaluminum, titanium tetrabromide and iodine; diethylmagnesium, titanium tetrachloride and hydrogen iodide; diphenylmagnesium, titanium tetrabromide and hydrogen iodide; triethylaluminum, titanium tetrachloride and hydrogen iodide; diethylmagnesium, titanium tetrachloride, and lithium iodide; tri-n-butylaluminum, titanium tetrabromide and lithium iodide; diisobutylaluminum hydride, titanium tetrachloride and lithium iodide; diphenylmagnesium, titanium tetrachloride and iodine trichloride; triethylaluminum, titanium tetrachloride and iodine monochloride; diphenylaluminum hydride, titanium tetrabromide and iodine tribromide; triisobutylaluminum, titanium tetrachloride and isobutyl iodide; triethylaluminum, titanium tetrachloride an iodoform; diethylmagnesium, titanium tetrabromide and methyl iodide; diphenylzinc and titanium tetraiodide; di - 2 - tolylmercury and titanium tetraiodide; tricyclohexylaluminum, titanium tetrachloride and titanium tetraiodide; ethylcyclopentylzinc and titanium tetraiodide; tri(3-isobutylcyclohexyl)aluminum and titanium tetraiodide; tetraethyllead, titanium tetrachloride and titanium tetraiodide; trimethylphenyllead, titanium tetrachloride and titanium tetraiodide; diphenylmagnesium and titanium tetraiodide; di - n - propylmagnesium, titanium tetrachloride and titanium tetraiodide; dimethylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium an titanium tetraioide; triisobutylaluminum, titanium tetrachloride, and antimony triiodide; triisobutylaluminum, titanium tetrachloride and aluminum triiodide; triisobutylaluminum, titanium tetrabromide, and aluminum triiodide; triethylaluminum, titanium tetrachloride and phosphorus triiodide; tri - n - dodecylaluminum, titanium tetrachloride, and tin tetraiodide; triethylgallium, titanium tetrabromide, and aluminum triiodide; tri - n - butylaluminum, titanium tetrachloride, and antimony triiodide; tricyclopentylaluminum, titanium tetrachloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutylaluminum, titanium tetraiodide, and tin tetrabromide; triethylgallium, titanium tetraiodide, and aluminum tribromide; triethylaluminum, titanium tetraiodide, and arsenic trichloride; and tribenzylaluminum, titanium tetraiodide, and germanium tetrachloride.

The polymerization process of this invention is generally carried out in the presence of a hydrocarbon diluent which is not deleterious to the catalyst system. Examples of suitable diluents include aromatic, paraffinic and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst employed in copolymerizing 1,3-butadiene and a norbornadiene can vary over a rather wide range. The amount of the organometal used in forming the catalyst composition is usually in the range of 0.75 to 20 mols per mol of the halogen-containing component, i.e., a metal halide with or without a second metal halide or elemental iodine. The mol ratio actually used in a polymerization will depend upon the particular components employed in the catalyst system. However, a preferred mol ratio is generally from 1:1 to 12:1 of the organometal compound to the halogen-containing component. When using a catalyst prepared from an organometal compound and more than one metal halide, e.g., titanium tetrachloride and titanium tetraiodide, titanium tetrachloride or tetrabromide and aluminum iodide, the mol ratio of the tetrachloride or tetrabromide to the iodide is usually in the range of 0.05:1 to 5:1. With a catalyst system formed from an organometal compound, a titanium chloride or bromide, and elemental iodine, hydrogen iodide, lithium iodide, an iodine halide or an iodohydrocarbon, the mol ratio of titanium halide to iodine-containing component is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The process of this invention can be conducted at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

The process of this invention can be carried out as a batch process by charging 1,3-butadiene and the norbornadiene to a reactor containing catalyst and diluent. Although any suitable charging procedure can be used, it is often preferred to add the monomers to a reactor containing diluent and thereafter introduce the catalyst components. It is to be understood that it is within the scope of the invention to preform the catalyst by mixing the catalyst components within a separate catalyst preparation vessel. The resulting mixture can then be passed into the reactor containing the monomers and diluent, or these latter materials can be added after the catalyst. The process can also be carried out continuously by maintaining the above-mentioned concentrations of reactants in the reactor for a suitable residence time. In a continuous process the residence time will, of course, vary within rather wide limits, depending upon such variables as temperature, pressure, the ratio of catalyst components and the catalyst concentration. The residence time in a continuous process usually falls within the range of one second to two hours when conditions within the specified ranges are employed. When a batch process is utilized, the time for the reaction can be as high as 24 hours or more.

Various materials are known to be detrimental to the catalyst employed in the present process. These materials include carbon dioxide, oxygen and water. It is usually desirable, therefore, that the butadiene, the norbornadiene and diluent be freed of these materials as well as other materials which may tend to inactivate the catalyst. Furthermore, it is desirable to remove air and moisture from the reaction vessel in which the polymerization is to be conducted.

Upon completion of the polymerization in which the copolymer of butadiene and a norbornadiene is prepared, the reaction mixture is then treated to inactivate the catalyst and recover the rubbery polymer. Any suitable method can be employed in carrying out the treatment of the reaction mixture. In one method the polymer is recovered by steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable method, such as by decantation or filtration. It is often preferred to add initially only an amount of the catalyst-inactivating material which is sufficient to inactivate the catalyst without causing precipitation of the polymer. It has been found to be advantageous to add an antioxidant, such as 4,4'-methylene-bis(2,6-di-tert-butylphenol), to the polymer solution prior to recovery of the polymer. After addition of the catalyst-inactivating material and the antioxidant, the polymer present in the solution can then be separated by the addition of an excess of a material such as ethyl alcohol or isopropyl alcohol. It is, of course, to be realized that it is within the scope of the invention to employ other suitable methods to recover the polymer. After separation from the water and alcohol and diluent by filtration or other suitable means, the polymer is then dried.

The copolymers produced in accordance with this invention are rubbery polymers. The polymers can be compounded by the various methods that have been used in the past in compounding natural and synthetic rubbers. Vulcanization accelerators, vulcanizing agents, reinforcing agents, and fillers such as have been employed in natural or synthetic rubbers can likewise be used in compounding the rubbers of this invention. It is also within the scope of this invention to blend the polymers with other polymeric material such as natural rubber, cis 1,4-polyisoprene, polyethylene and the like. As mentioned previously, the polymers of this invention have a very high cis-content, and this property renders them very suitable for applications requiring low hysteresis, high resilience and low freeze point. In general, the products have utility in applications where natural and synthetic rubbers are used. They are particularly suitable for use in the manufacture of automobile and truck tires and other rubbery articles, such as gaskets.

A more comprehensive understanding of the invention can be obtained by referring to the following illustrative examples which are not intended, however, to be unduly limitative of the invention.

EXAMPLE I

A series of runs was carried out in which 1,3-butadiene was copolymerized with variable quantities of norbornadiene using a catalyst formed by mixing triisobutylaluminum, titanium tetrachloride and iodine. Control runs were also conducted in which no norbornadiene was present in the polymerization system. The following recipe was employed in the runs:

*Recipe*

| | Parts by weight |
|---|---|
| 1,3-butadiene | 100 |
| Toluene | 1000 |
| Norbornadiene (NBD) | Variable |
| Triisobutylaluminum (TBA) | Variable |
| Iodine ($I_2$) | Variable |
| Titanium tetrachloride (TTC) | Variable |
| TBA/$I_2$/TTC mol ratio | 6/2/1 |
| Temperature, ° F. | 41 |
| Time, hours | 2 |

The procedure followed in each of the runs was to charge the toluene first to the reactor. After purging the reactor with nitrogen, the 1,3-butadiene was introduced. The norbornadiene was then added, followed by the triisobutylaluminum and iodine, each of the three materials being in toluene solution. The mixture was then cooled to 41° F., after which titanium tetrachloride was charged. After a two hour polymerization period, the reaction was terminated by adding one part by weight of 2,2'-methylene-bis(4-methyl-6-tert-butylphenol) dissolved in a mixture of equal volumes of isopropyl alcohol and toluene. The polymer was then coagulated in isopropyl alcohol, separated and dried. The results of the runs are shown below in Table I.

TABLE I

| Run No. | TBA, mhm.[1] | I$_2$, mhm.[1] | TTC, mhm.[1] | NBD, phm.[2] | Conv., percent | Cold Flow,[3] mg./min. | ML-4[4] at 212° F. |
|---|---|---|---|---|---|---|---|
| 1 | 2.2 | 0.734 | 0.367 | 0 | 72 | 7.3 | 43 |
| 2 | 2.4 | 0.8 | 0.4 | 0 | 64 | 21 | 23 |
| 3 | 2.6 | 0.866 | 0.433 | 0 | 62 | 30 | 20 |
| 4 | 2.8 | 0.933 | 0.467 | 0 | 62 | 34 | 17 |
| 5 | 2.2 | 0.734 | 0.367 | 0.1 | 66 | 5.5 | 34 |
| 6 | 2.4 | 0.8 | 0.4 | 0.1 | 60 | 13 | 29 |
| 7 | 2.6 | 0.866 | 0.433 | 0.1 | 62 | 17 | 24 |
| 8 | 2.8 | 0.933 | 0.467 | 0.1 | 62 | 23 | 18 |
| 9 | 2.2 | 0.734 | 0.367 | 0.2 | 70 | 1.7 | 48 |
| 10 | 2.4 | 0.8 | 0.4 | 0.2 | 65 | 5.3 | 33 |
| 11 | 2.6 | 0.866 | 0.433 | 0.2 | 62 | 9.3 | 27 |
| 12 | 2.8 | 0.933 | 0.467 | 0.2 | 60 | 15 | 20 |
| 13 | 2.4 | 0.8 | 0.4 | 0.4 | 65 | 2.0 | 30 |
| 14 | 2.6 | 0.866 | 0.433 | 0.4 | 58 | 7.7 | 28 |
| 15 | 2.8 | 0.933 | 0.467 | 0.4 | 58 | 9.2 | 22 |
| 16 | 3.0 | 1.0 | 0.5 | 0.4 | 58 | 15 | 19 |
| 17 | 2.4 | 0.8 | 0.4 | 0.6 | 67 | 0.0 | 60 |
| 18 | 2.6 | 0.866 | 0.433 | 0.6 | 60 | 1.1 | 42 |
| 19 | 2.8 | 0.933 | 0.467 | 0.6 | 56 | 3.1 | 27 |
| 20 | 3.0 | 1.0 | 0.5 | 0.6 | 60 | 9.4 | 22 |
| 21 | 2.6 | 0.866 | 0.433 | 0.8 | 58 | 0.0 | 43 |
| 22 | 2.8 | 0.933 | 0.467 | 0.8 | 58 | 0.6 | 34 |
| 23 | 3.0 | 2.0 | 0.5 | 0.8 | 90 | 0.0 | -------- |
| 24 | 3.2 | 1.07 | 0.533 | 0.8 | 59 | 3.6 | 25 |

[1] Millimols per 100 grams of butadiene.
[2] Parts by weight per 100 parts by weight of butadiene.
[3] Cold flow was measured by extruding the rubber through a ¼-inch orifice at 3.5 p.s.i. pressure and a temperature of 50° C. (122° F.). After allowing 10 minutes to reach steady state, the rate of extrusion was measured and the values reported in milligrams per minute.
[4] ASTM-D1646-61, Mooney viscometer, large rotor, 212° F., 4 minutes.

The data in the foregoing table show that by copolymerizing 1,3-butadiene with norbornadiene a product having a greatly reduced tendency to cold flow is obtained.

EXAMPLE II

Two series of runs were carried out in which the polymerization times were varied. In one series of runs a mixture of 1,3-butadiene and norbornadiene was polymerized while in the other series there was no norbornadiene present in the system. The following recipe was used in the runs.

Recipe

| | Parts by weight |
|---|---|
| 1,3-butadiene, parts by weight | 100 |
| Toluene, parts by weight | 1000 |
| Triisobutylaluminum (TBA), mhm | 2.5 |
| Iodine (I$_2$), mhm | 0.8 |
| Titanium tetrachloride (TTC), mhm | 0.4 |
| Norbornadiene (NBD), phm | 0.1 or 0 |
| Temperature, ° F. | 41 |
| Time, hours | Variable |

The procedure followed in the runs was the same as that described in Example I. The results obtained are set forth below in Table II.

TABLE II

| Run No. | NBD, phm. | Time, Hours | Conv., Percent | Cold Flow,[1] mg./min. | Inh.[2] Visc. | Gel, Percent | ML-4[1] at 212° F. |
|---|---|---|---|---|---|---|---|
| 1 | 0 | 1.0 | 70 | 19 | 2.17 | 0 | -------- |
| 2 | 0 | 2.0 | 73 | 12 | | | -------- |
| 3 | 0 | 2.5 | 75 | 10 | | | -------- |
| 4 | 0 | 3.0 | 76 | 8.1 | 2.23 | 0 | -------- |
| 5 | 0 | 19 | 93 | 2.9 | | | 35 |
| 6 | 0.1 | 1.0 | 68 | 7.3 | 2.22 | 0 | -------- |
| 7 | 0.1 | 2.0 | 72 | 5.1 | 2.30 | 0 | -------- |
| 8 | 0.1 | 2.5 | 75 | 4.0 | | | -------- |
| 9 | 0.1 | 3.0 | 76 | 3.6 | 2.25 | 0 | -------- |
| 10 | 0.1 | 19 | 95 | 0.0 | | | 46 |

[1] See appropriate footnote to Table I.
[2] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

The data in the foregoing table demonstrate that the cold flow tendency of each of the products was reduced as the polymerization time was extended. Each control run (Runs 1 to 5) had a considerably higher cold flow value than the corresponding run in which norbornadiene was present.

EXAMPLE III

A run was carried out in which a mixture of butadiene and norbornadiene was polymerized in the presence of a catalyst formed by mixing triisobutylaluminum, titanium tetrachloride and iodine. A control run was also conducted in which there was no norbornadiene present in the system. The recipe used was the same as that used in Example II except that 0.5 phm or norbornadiene was used instead of 0.1 phm. The polymerization temperature used was 41° F. and the polymerization time was 2 hours. The results of the runs are shown below in Table III.

TABLE III

| Run No. | NBD, phm. | Conv., Percent | Cold Flow,[1] mg./min. | ML-4[1] at 212° F. | Inh.[1] Visc. | Gel, Percent | Microstructure, Percent [2] | | |
|---|---|---|---|---|---|---|---|---|---|
| | | | | | | | Cis. | Trans. | Vinyl |
| 1 | 0 | 84 | 6.7 | 40 | 2.42 | 0 | 94.6 | 2.1 | 3.3 |
| 2 | 0.5 | 77 | 0.0 | 61 | 2.75 | 0 | 95.0 | 1.8 | 3.2 |

[1] See appropriate footnote to Tables I and II.
[2] Samples of the polymers were dissolved in carbon disulfide to form a solution having 25 grams of polymer per liter of solution. The infrared spectrum of each of the solutions (percent transmission) was then determined in a conventional infrared spectrometer. The percent of the total unsaturation present as trans 1,4- was calculated according to the following equation and consistent units: $\epsilon = \frac{E}{tc}$, where $\epsilon$ =extinction coefficient (liters-mols$^{-1}$-centimeters$^{-1}$); E=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$). The percent of the total unsaturation present as 1,2- (or vinyl) was calculated according to the above equation using, the 11.0 micron band and an extinction coefficient of 209 (liters-mols$^{-1}$-centimeters$^{-1}$). The percent of the total unsaturation present as cis 1,4- was obtained by subtracting the trans 1,4- and 1,2- (vinyl) determined according to the above procedure from the theoretical unsaturation, assuming one double bond per each $C_4$ unit in the polymer.

The data in the foregoing table demonstrate that the copolymer of this invention contained about the same amount of cis 1,4-addition as conventional cis-polybutadiene.

EXAMPLE IV

Three runs were carried out in which a mixture of 1,3-butadiene and norbornadiene was polymerized in the presence of a triisobutylaluminum-iodine-titanium tetrachloride catalyst system. The mol ratio of these ingredients in each of the runs was 6/1.5/1. A cis-polybutadiene was also prepared by polymerizing butadiene with a same catalyst system but in the absence of norbornadiene. The four polymers obtained were compounded in accordance with the recipe shown below.

*Recipe*

| | Parts by weight |
|---|---|
| Polymer | 100 |
| Carbon black [1] | 50 |
| Zinc oxide | 3 |
| Stearic acid | 1 |

*Recipe—Continued*

| | Parts by weight |
|---|---|
| Flexamine [2] | 1 |
| Resin 731 [3] | 5 |
| Philrich 5 [4] | 5 |
| Sulfur | 1.75 |
| NOBS special [5] | 1.0 |

[1] High abrasion furnace black.
[2] Physical mixture containing 65 percent of a complex diarylamine-ketone reaction product and 35 percent of N,N'-diphenyl-p-phenylenediamine.
[3] Disproportionated pale rosin stable to heat and light.
[4] Aromatic oil.
[5] N-oxydiethylene-2-benzothiazyl sulfenamide.

TABLE IV

| | 1 | 2 | 3 | Control |
|---|---|---|---|---|
| Nonbornadiene, phm | 0.4 | 0.4 | 0.5 | 0.0 |
| Conversion, percent | 79 | 84 | 62 | |
| Mooney (ML-4 at 212° F.)[1] | 47 | 37 | 33.5 | 45 |
| Cold flow, mg./min.[1] | 0.5 | 0.6 | 1.2 | 1.4 |
| Compounded Mooney (MS-1½ at 212° F.)[2] | 38.5 | 32 | 30.5 | 43 |
| Scorch time, min. to 5 point Mooney rise [3] | 23.8 | 25.4 | 26.4 | 16.6 |
| Extrusion at 250° F.[4]: | | | | |
| Inches/minute | 29 | 30.5 | 35 | 34.5 |
| Grams/minute | 90.5 | 94 | 99.5 | 95 |
| Rating (Garvey Die) | −8 | −11 | −12 | +5 |
| Banbury mixing time to 300° F. dump temperature, sec | 350 | 285 | 270 | 365 |

Physical Properties of Vulcanizates

| | 1 | 2 | 3 | Control |
|---|---|---|---|---|
| $v \times 10^4$, mols./cc.[5] | 2.02 | 1.90 | 1.93 | 2.13 |
| 300 percent Modulus, p.s.i.[6] | 1,250 | 1,180 | 1,170 | 1,320 |
| Tensile, p.s.i.[6] | 2,590 | 2,730 | 2,730 | 2,720 |
| Elongation, percent [6] | 480 | 520 | 530 | 485 |
| Heat Buildup Δ T,° F.[7] | 45.2 | 47.7 | 49.2 | 45.5 |
| Resilience, percent [8] | 76.5 | 76.3 | 76.0 | 76.5 |
| Shore A hardness [9] | 61 | 60.5 | 61 | 64 |

[1] See appropriate footnotes to Table I.
[2] ASTM D1646-61, Mooney Viscometer, small rotor, 212° F., 1.5 minutes.
[3] ASTM D1646-61, Mooney Viscometer, large rotor, Scorch in minutes to 5 point rise above minimum Mooney.
[4] No. ½ Royle Extruder with Garvey die. See Ind. Eng. Chem. 34, 1309 (1942). As regards the "rating" figure, 12 designates an extruded product considered to be perfectly formed whereas lower numerals indicate less perfect products.
[5] Determined by the swelling method of Kraus as given in Rubber World, October, 1956. This value is the number of effective network chains per unit volume of rubber. The higher the number, the more the rubber is crosslinked (vulcanized).
[6] ASTM D412-61T. Scott Tensile Machine L-6. Tests are made at 80° F. unless otherwise designated.
[7] ASTM D623-58. Method A, Goodrich Flexometer, 143 lbs./sq. inch load, 0.175 inch stroke. Test specimen is a right circular cylinder 0.7 inch in diameter and 1 inch high.
[8] ASTM D945-59 (modified). Yerzley oscillograph. Test specimen is a right circular cylinder 0.7 inch in diameter and 1 inch high.
[9] ASTM D676-59T. Shore Durometer, Type A.

Physical properties of the raw polymers, processing data, and properties of the vulcanizates (stocks cured for 30 minutes at 307° F.) are presented above in Table IV.

The three polymers prepared in accordance with the present invention had lower cold flow values and better processing properties than the control polymer. The scorch time was longer, the extrusion rating was better, the Banbury mixing time was shorter, and mill handling was better for these three rubbers than for the control rubber. The physical properties of the four vulcanized stocks were similar.

EXAMPLE V

The three polymers of this invention and the control polymer, as described in Example IV, were each blended with a butadiene-styrene rubber that was plasticized with a highly aromatic processing oil. The butadiene/styrene rubber, which was prepared by emulsion polymerization at 41° F., had a bound styrene content of 23.5 weight percent and a Mooney value (ML-4 at 212° F.) of 51. The amount of plasticizer oil employed was 37.50 parts by weight per 100 parts by weight of the butadiene/styrene rubber. Each of the blends was compounded, and the processing properties were determined. The compounding recipe employed and the processing properties observed are shown below in Table V.

TABLE VI

| Run No. | Catalyst Component | Monomers |
|---|---|---|
| 1 | Triisobutylaluminum, titanium tetraiodide. | 1,3-butadiene, 7-methyl-norbornadiene. |
| 2 | Triethylaluminum, titanium tetrachloride, titanium tetraiodide. | 1,3-butadiene, 7-n-butyl-norbornadienes. |
| 3 | Diphenylmagnesium, titanium tetrachloride, iodine. | 1,3-butadiene, 1-ethyl-norbornadiene. |
| 4 | Triisobutylaluminum, titanium tetrachloride, aluminum triiodide. | 1,3-butadiene, 2-methyl-norbornadiene. |
| 5 | Triisobutylaluminum, titanium tetrachloride, hydrogen iodide. | 1,3-butadiene, 2-n-propyl-norbornadiene. |
| 6 | Triethylaluminum, titanium tetrachloride, iodine. | 1,3-butadiene, norbornadiene. |

TABLE V

| | 1 | 2 | 3 | Control |
|---|---|---|---|---|
| Compounding Recipe, Parts by Weight | | | | |
| Butadiene/norbornadiene copolymer | 50 | 50 | 50 | |
| Cis-Polybutadiene | | | | 50 |
| Butadiene/styrene rubber [1] | 68.75 | 68.75 | 68.75 | 68.75 |
| High abrasion furnace black | 50 | 50 | 50 | 50 |
| Zinc oxide | 3 | 3 | 3 | 3 |
| Stearic acid | 2 | 2 | 2 | 2 |
| Wingstay 100 [2] | 1 | 1 | 1 | 1 |
| Age-Rite Resin D [3] | 2 | 2 | 2 | 2 |
| Paraffin wax | 3 | 3 | 3 | 3 |
| Sulfur | 1.75 | 1.75 | 1.75 | 1.75 |
| NOBS Special [4] | 1.0 | 1.0 | 1.0 | 1.0 |
| Processing Properties | | | | |
| Banbury mixing time to 300° F. dump temp., sec | 300 | 280 | 270 | 420 |
| Total power, Watt Hours [5] | 560 | 510 | 490 | 790 |
| Compounded Mooney (MS-1½ at 212° F.)[6] | 28.5 | 25.0 | 25.0 | 30.0 |
| Extrusion at 250° F. [6]: | | | | |
| Inches/minute | 44.8 | 45.2 | 46.0 | 46.8 |
| Grams/minute | 138.0 | 138.0 | 140.0 | 139.5 |
| Rating (Garvey Die) | 11 | −12 | −12 | 10 |
| Mill banding [7] | 10 | 10 | 10 | 3 |
| Mix rating | 7 | 8 | 8 | 3 |

[1] The 68.75 parts used contained 50 parts by weight rubber and 18.75 parts by weight highly aromatic processing oil.
[2] Mixture of diaryl-p-phenylene diamines.
[3] Polymerized trimethyldihydroquinoline.
[4] N-oxydiethylene-2-benzothiazyl sulfenamide.
[5] Total power required for mixing operation.
[6] See appropriate footnotes to Table IV.
[7] Based on a 0-10 rating scale with a high number being best.

The data in Table V show that the blends prepared with the polymers of this invention gave compositions having much better processing properties than the composition prepared with the control polymer. Thus, the blends prepared with the present copolymers required a shorter mixing time and less power input for mixing, broke down more readily as shown by compounded Mooney values, had a higher extrusion rating, better mill banding, and a higher mix rating. When the stocks were cured for 30 minutes at 307° F., physical properties of the vulcanizates were similar.

EXAMPLE VI

Runs are carried out in which mixtures of 1,3-butadiene and various norbornadienes are polymerized with catalyst systems formed by mixing an organo-metal and an iodine-containing component. The procedure followed in carrying out the runs is essentially the same as that described in Example I. The components used in preparing the catalyst and the monomers copolymerized in the runs are shown below in Table VI.

Infrared analysis of the products of the foregoing runs shows the presence of units in the polymer attributable to the cyclic compound, thereby indicating that the products are copolymers of 1,3-butadiene and a norbornadiene. The copolymers have a reduced tendency to cold flow in the unvulcanized state and possess good processing properties.

As will be evident to those skilled in the art, many variations and modifications of the invention can be practiced in view of the foregoing disclosure. Such variations and modifications are believed to come within the spirit and scope of the invention.

We claim:
1. In a process for polymerizing 1,3-butadiene with an iodine containing catalyst which forms on mixing components comprising an organometal component and a titanium halide component, the improvement which comprises polymerizing said 1,3-butadiene with a minor amount of a norbornadiene having the following formula

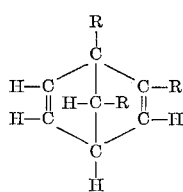

wherein R is selected from the group consisting of hydrogen and an alkyl group containing from 1 to 4, inclusive, carbon atoms and wherein at least two of said R groups are hydrogen, to produce a polymer wherein at least 85 percent of the butadiene units have a cis 1,4-configuration.

2. In a process for polymerizing 1,3-butadiene in the presence of a hydrocarbon diluent with an iodine containing catalyst which forms on mixing an organometal component and a titanium halide component, the improvement which comprises polymerizing said 1,3-butadiene within the range of 0.01 to 10 parts by weight per 100 parts by weight of said 1,3-butadiene of a norbornadiene having the following formula:

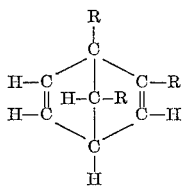

wherein R is selected from the group consisting of hydrogen and an alkyl group containing from 1 to 4, inclusive, carbon atoms and wherein at least two of said R groups are hydrogen, said polymerizing occurring at a temperature in the range of −100 to 250° F. and at a pressure sufficient to maintain said hydrocarbon diluent in liquid phase; and recovering a product having a reduced tendency to cold flow in the unvulcanized state wherein at least 85 percent of the butadiene units have a cis 1,4-configuration.

3. A process according to claim 2 in which said catalyst is one which forms on mixing components consisting essentially of a trialkylaluminum, titanium tetrachloride and iodine.

4. A process according to claim 2 in which said catalyst is one which forms on mixing components consisting essentially of a trialkylaluminum, titanium tetrachloride and titanium tetraiodide.

5. A process according to claim 2 in which said catalyst is one which forms on mixing components consisting essentially of a trialkylaluminum, titanium tetraiodide.

6. A process according to claim 2 in which said catalyst is one which forms on mixing components consisting essentially of a trialkylaluminum, titanium tetrachloride and hydrogen iodide.

7. A process according to claim 2 in which said catalyst is one which forms on mixing components consisting essentially of a trialkylaluminum, titanium tetrachloride and methyl iodide.

8. A process according to claim 2 in which said norbornadiene is norbornadiene.

9. A process according to claim 2 in which said norbornadiene is 7-methylnorbornadiene.

10. A process according to claim 2 in which said norbornadiene is 1-ethylnorbornadiene.

11. A process according to claim 2 in which said norbornadiene is 2-methylnorbornadiene.

12. In a process for polymerizing 1,3-butadiene with an iodine containing catalyst which forms on mixing components comprising an organometal component and a titanium halide component, the improvement which comprises polymerizing said 1,3-butadiene with 0.01 to 10 parts by weight of norbornadiene, based on 100 parts by weight of 1,3-butadiene, in the presence of a hydrocarbon diluent at a temperature in the range of −30 to 160° F. and at a pressure sufficient to maintain said hydrocarbon diluent in liquid phase; and recovering a copolymer of 1,3-butadiene and norbornadiene wherein at least 85 percent of the butadiene units have a cis 1,4-configuration.

References Cited by the Examiner
UNITED STATES PATENTS 3,220,999  11/1965  Duck et al. _____ 260—94.3

JOSEPH L. SCHOFER, *Primary Examiner.*

E. J. SMITH, *Assistant Examiner.*